July 14, 1959

J. C. CHUPA 2,894,746

TETHER BALL

Filed May 22, 1956

INVENTOR.
JOHN C. CHUPA
BY
Ely, Pearne & Gordon
ATTORNEYS

July 14, 1959 J. C. CHUPA 2,894,746
TETHER BALL
Filed May 22, 1956 2 Sheets-Sheet 2
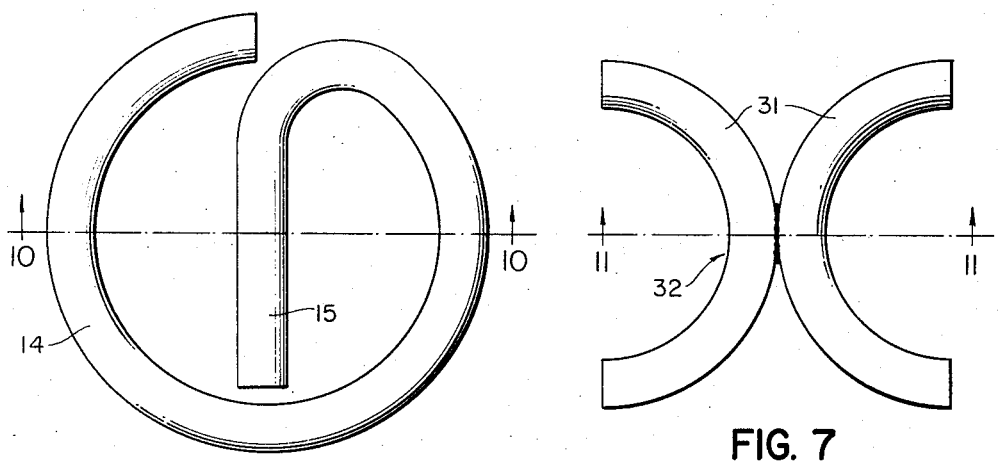
FIG. 6 FIG. 7
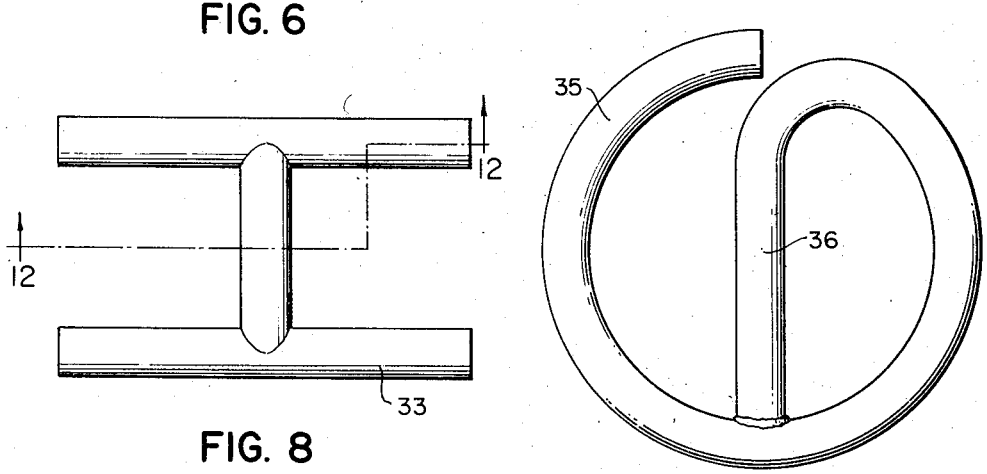
FIG. 8 FIG. 9
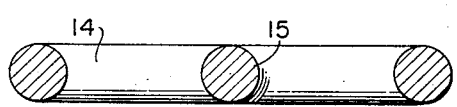 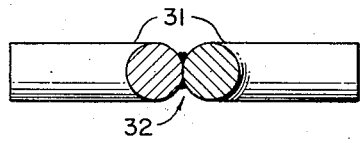
FIG. 10 FIG. 11
FIG. 12
INVENTOR.
JOHN C. CHUPA
BY Ely, Pearne & Gordon
ATTORNEYS

United States Patent Office 2,894,746
Patented July 14, 1959

2,894,746

TETHER BALL

John C. Chupa, Sandusky, Ohio, assignor to The Barr Rubber Products Company, Sandusky, Ohio, a corporation of Ohio Application May 22, 1956, Serial No. 586,579

3 Claims. (Cl. 273—58)

This invention relates to tether balls and more particularly to inflatable tether balls and to the means for latching inflatable tether balls to a rope or similar flexible line.

The invention applies to tethered athletic balls, net floats, sewer balls and the like, and the term "tether ball" as used herein applies to all such balls regardless of the particular application in which they are used.

An object of the invention is to provide an inflatable or gas filled tether ball in which gas leakage is minimized by exploiting the constraints to which such balls are naturally subjected.

Another object of the invention is to provide an inflatable or gas filled tether ball which can be manufactured at lower cost than those of the prior art.

Another object of the invention is to provide an inflatable tether ball in which the rope latch and valve housing are bonded to the body or wall of the ball in a unitary manner.

These and additional objects and advantages of the invention will become more fully apparent from the following description of examples of the invention in which reference is made to the accompanying drawings. In the drawings:

Figure 6 is a detail plan view of the securing means included in the structure shown in Figures 1, 2 and 3.

Figures 7, 8 and 9 are plan views of three alternative forms of securing means which may be provided according to the invention.

Figures 10, 11 and 12 are sectional views taken on lines 10—10, 11—11, and 12—12, respectively, in Figures 6, 7, and 8.

Figure 1:
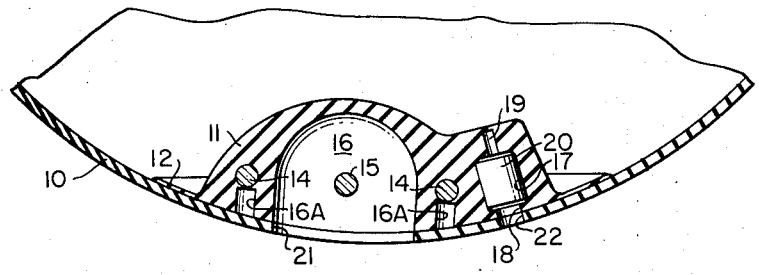
Figure 1 is a sectional fragmentary view of a tether ball structure embodying the invention.
Figure 4:
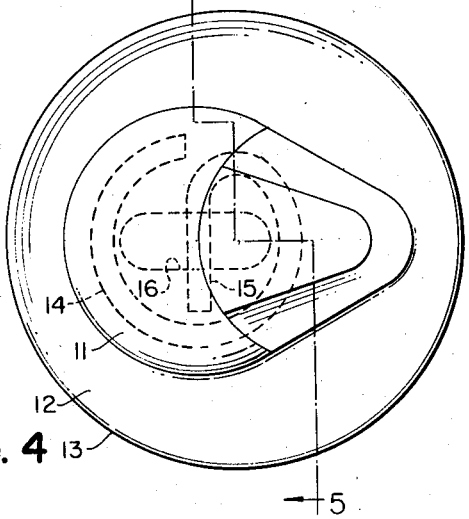
Figure 4 is a top plan view of the structure shown in Figure 1, with the envelope of the bag omitted for purposes of clarity.
Figure 5:
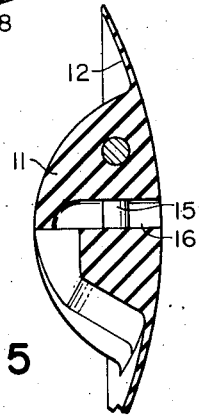
Figure 5 is a view taken on line 5—5 in Figure 4.

Shown in Figure 1 is a fragmentary view of a tether ball structure in which the ball envelope 10 is bonded to the outer face of a unitary housing 11 preferably of molded rubber or similar material. The envelope 10 and housing 11 may be bonded together in any conventional manner. The housing 11 is preferably formed with a surrounding flange 12, the boundary 13 of which may be circular, as shown in Figure 4. Embedded in the housing 11 is a securing member 14 which may be bent in the shape of a circle with an additional transverse leg 15. During the molding of the housing 11, the member 14 may be supported on mold pins which will cause small holes 16A to be formed in the housing 11. The housing 11 is molded or otherwise formed with a deep outwardly facing pocket or cavity 16 through which the leg 15 extends at a preferably intermediate level. To the side of the pocket 16 is formed a plug chamber 17 which communicates with the outer face of the housing 11 through a somewhat reduced opening 18. A coaxial small hole or bore 19 is preferably provided, which extends inwardly from the plug chamber 17 toward the inner surface of the housing 11.

The chamber 11 is adapted to tightly receive a valve plug 20 of rubber, vinyl or similar material, to provide a structure through which an inflating needle can be passed again and again as occasions arise for inflation or reinflation of the ball. It will be understood by those familiar with the art that the plug 20 is constrained within the housing and will act to effectively seal off the line of puncture formed by an inflating needle which is passed down through the length of the plug and into the interior of the ball and is then withdrawn after inflation is completed. Openings 21 and 22 are cut in the wall 10 and may register with the pocket 16 and the opening 18, respectively.

The rope or line to which the ball is to be tethered is passed around the leg 15 and is tied to itself or is knotted at its end to prevent its withdrawal through the pocket 16 and under the leg 15, or it is otherwise fastened to the leg 15. Inclusion of the securing member 14 and the valve plug 20 within a unitary housing serves to exploit the constraints which are naturally imposed on a tether ball. Plug valves for use with inflating needles are simple and inexpensive compared with other types of valves, and for that reason they are widely used in play balls and similar inflatable articles. However, they are subject to some degree of intermittent leakage due to flexure of the valve structure, which is caused by bouncing or other temporary but acute deformation of the ball in the vicinity of the valve. The consequent troublesome necessity for relatively frequent reinflation of the ball tends to outweight the advantages of low cost and long term reliability, which are native to this type of valve. However, when the valve is included within a unitary housing which also forms a tethering means, flexure of the valve is minimized and the valve is always positioned so that, in use, the ball on which the valve is employed will not be subjected to bouncing or similar temporary but acute deformation in the vicinity of the valve.

Figure 2:
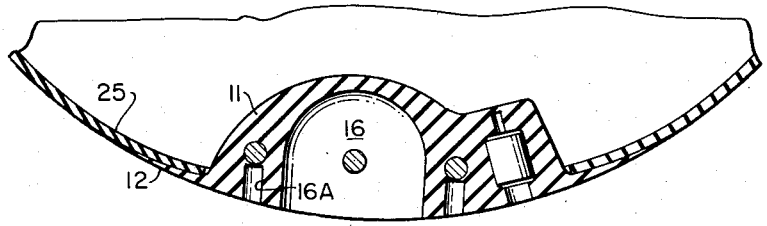
Figure 2 is a sectional fragmentary view of another tether ball structure embodying the invention.
Figure 3:
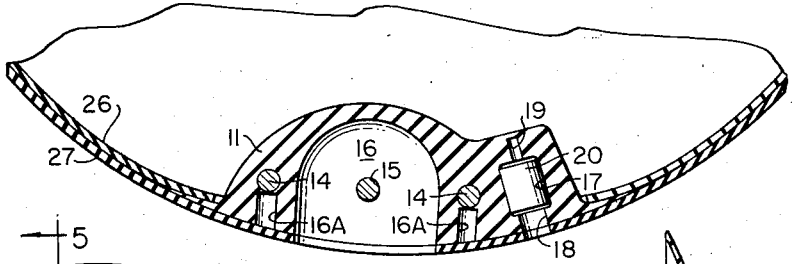
Figure 3 is a sectional fragmentary view of a third tether ball structure embodying the invention.

A housing, such as the housing 11, may be included in a tether ball structure, such as that shown in Figure 2. Here the ball envelope 25 underlies and is bonded to the flange 12 and is cut out around the main bulk of the housing 11. The periphery of the flange 12 is preferably feathered into the wall 25. In balls comprising laminated or multiple-ply stock, it may be desirable to anchor a housing, such as the housing 11, between certain of the several laminations or plies. For example, in Figure 3 there is shown an envelope comprising the plies 26 and 27. A housing 11 is provided, and the flange 12 of this housing is bonded to both the inner ply 26 and the outer ply 27. The inner ply 26 is cut out around the main bulk of the housing 11 and is bonded to the inner face of the flange 12. The outer ply 27 passes over the outer face of the housing 11 and is bonded thereto, cut-outs being formed in the outer ply at the locations of the pocket 16 and the opening 18, as shown.

The securing member 14 may be very economically manufactured in great quantities from heavy metal wire or rod stock. It may be replaced by other forms of securing members, such as those shown in Figures 7, 8, 9, 11 and 12. Figures 7 and 11 show a securing member comprising half rings 31 positioned in back-to-back relation and welded together at 32. The adjoining portions of the half rings 31 would pass through the pocket 16 and would serve the same function as the leg 15. Figures 8 and 12 show a metal stamping 33 in the form of an H, with the cross-arm of the H performing the same function as the leg 15. The H would be formed of small stamped channels which could be U-shaped in cross-section, as may be seen in Figure 12. Figure 9 shows a securing member 35, which is similar to the member 14 except that the free end of the cross-arm 36 is welded to the circular portion of the securing member.

The above description of embodiments of the invention is made by way of example, and the invention is not necessarily limited to the inclusion of all the specific details thereof, but is defined by the following claims.

What is claimed is:

1. An inflatable tether ball structure comprising an air envelope, a housing body bonded to said air envelope and extending inwardly thereof and over a fraction of the inside area thereof, said housing body having an inner surface and an outer face, said housing body having a cavity formed therein and communicating with said outer face, said housing body also having a plug chamber formed therein, the cross-sectional conformations of said plug chamber being substantially similar along the length thereof, said plug chamber communicating with said outer face through a relatively restricted opening, securing means embedded in said housing body and extending transversely across said cavity in spaced relation with the bottom thereof, and a plug of resilient material positioned within said plug chamber in tightly gripped relationship to constitute a self-sealing valve for an inflating needle, whereby when said securing means is fastened to a flexible line and said ball is used, gas leakage through said valve will be minimized by exploiting the constraints to which the tether ball is naturally subjected.

2. An inflatable tether ball structure comprising an air envelope, a housing body bonded to said air envelope and extending inwardly thereof and over a fraction of the inside area thereof, said housing body having an inner surface and an outer face, said housing body having a cavity formed therein and communicating with said outer face, said housing body also having a plug chamber formed therein, said plug chamber communicating with said outer face through a relatively restricted opening, securing means embedded in said housing body and extending transversely across said cavity in spaced relation with the bottom thereof, and a plug of resilient material positioned within said plug chamber in tightly gripped relationship to constitute a self-sealing valve for an inflating needle, whereby when said securing means is fastened to a flexible line and said ball is used, gas leakage through said valve will be minimized by exploiting the constraints to which the tether ball is naturally subjected.

3. An inflatable tether ball structure comprising an air envelope, a housing body bonded to said air envelope and extending inwardly thereof and over a fraction of the inside area thereof, said housing body having an inner surface and an outer face, said housing body having a cavity formed therein and communicating with said outer face, said cavity comprising a short slot having greater depth than width, said housing body also having a plug chamber formed therein, the cross-sectional conformations of said plug chamber being substantially similar along the length thereof, said plug chamber communicating with said outer face through a relatively restricted opening, securing means embedded in said housing body in surrounding relationship with said slot and having a central portion extending transversely across said slot in spaced relation with the bottom thereof, and a plug of resilient material positioned within said plug chamber in tightly gripped relationship to constitute a self-sealing valve for an inflating needle, whereby when said securing means is fastened to a flexible line and said ball is used, gas leakage through said valve will be minimized by exploiting the constraints to which the tether ball is naturally subjected.

References Cited in the file of this patent

UNITED STATES PATENTS

| | | |
|---|---|---|
| 1,941,877 | Brazeau | Jan. 2, 1934 |
| 2,142,414 | Riddell | Jan. 3, 1939 |
| 2,387,433 | Fenton | Oct. 23, 1945 |
| 2,625,398 | Robinson et al. | Jan. 13, 1953 |
| 2,653,817 | Tebbetts | Sept. 29, 1953 |

FOREIGN PATENTS

| | | |
|---|---|---|
| 1,074,306 | France | Mar. 31, 1954 |